April 13, 1926.
J. BRANDSTETTER
WINDSHIELD GUARD
Filed Nov. 1, 1924
1,580,645
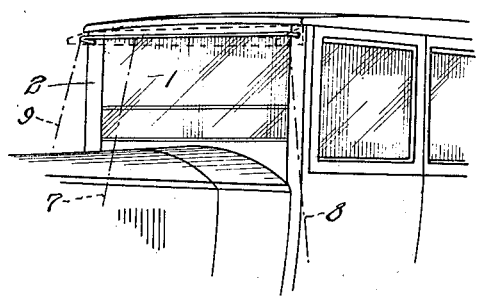
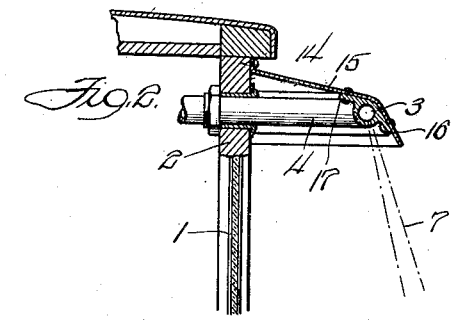
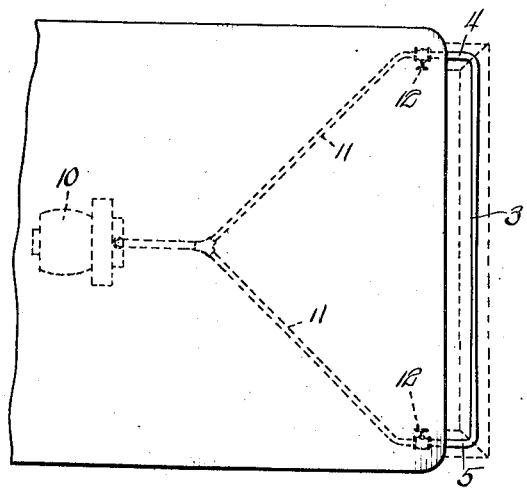
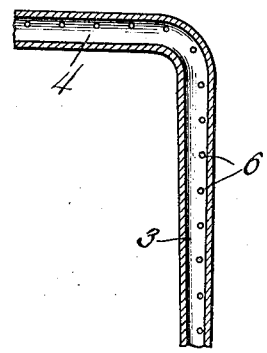
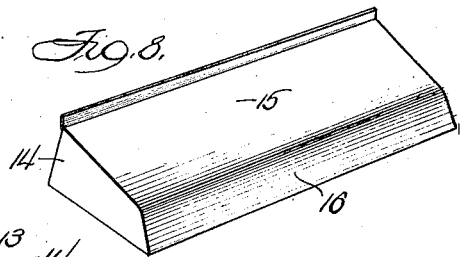
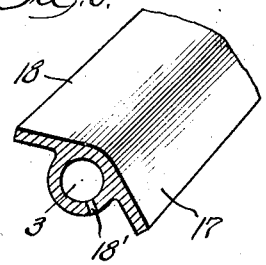
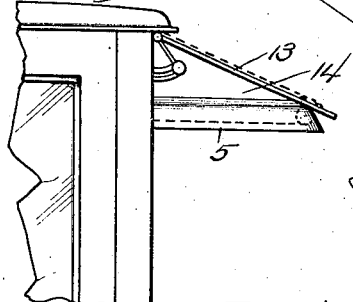
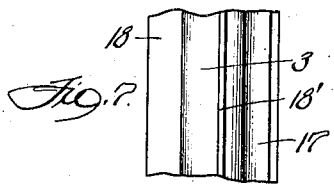
Witness:
W. K. Olson
Inventor:
Josef Brandstetter
by Albert Scheible
Attorney Patented Apr. 13, 1926.

1,580,645

UNITED STATES PATENT OFFICE.

JOSEF BRANDSTETTER, OF CHICAGO, ILLINOIS.

WINDSHIELD GUARD.

Application filed November 1, 1924. Serial No. 747,149.

*To all whom it may concern:*

Be it known that I, JOSEF BRANDSTETTER, citizen of the United States, residing at Chicago, in the county of Cook and State of Illinois, have invented certain new and useful Improvements in a Windshield Guard; and I do hereby declare the following to be a full, clear, and exact description of the invention, such as will enable others skilled in the art to which it appertains to make and use the same.

My invention relates to means preventing the deposition of moisture on the front window pane or wind-shield of a vehicle from obscuring the view of occupants of the vehicle, and particularly that of the driver.

Heretofore, this has been accomplished to a certain extent by employing so-called "wind-shield cleaners" for wiping the deposited moisture off a portion of the pane, but such appliances have proven seriously defective in practice, both because they require mechanism which is apt to get out of order and because they will not operate effectively under some of the moist weather conditions. So also, attempts have been made to remove the deposited moisture from the wind-shield or other front window portions of vehicles by blowing either cold or warm air against the same, but these arrangements likewise have proven inadequate for the intended purpose under some weather conditions.

My present invention aims to prevent such an obstruction of the driver's clear view by initially preventing the moisture from gathering on the glass pane, instead of allowing the moisture to accumulate there and then attempting to remove it. Furthermore, my invention aims to accomplish the intended purpose without employing any moving parts whatever in front of the vehicle and without requiring any mechanism other than that needed for providing a supply of compressed air, such a supply being already available on many classes of vehicles. So also, my invention aims to provide an arrangement for this purpose, which will be equally suited for use on various types of vehicles, including street cars and elevated railroad trains as well as automobiles, and including automobiles regardless of whether or not they are equipped with visors. Still further and more detailed objects of my invention will appear from the following specification and from the accompanying drawings, in which:

Fig. 1 is a perspective view of the forward portion of a closed automobile, showing a perforated tube mounted on the front of the vehicle for projecting an air curtain in accordance with my invention, with the hood over the air tube shown in dotted lines.

Fig. 2 is an enlarged central longitudinal section through a portion of Fig. 1, with dotted lines showing the direction in which the curtain of compressed air is projected in front of the window pane.

Fig. 3 is a fragmentary plan view of the embodiment of Fig. 1, diagrammatically showing the connections to a supply of compressed air, and with the hood also shown in dotted lines.

Fig. 4 is an enlarged horizontal section through a portion of the air-distributing duct of the embodiment of Fig. 3, showing the location of the air outlets in this duct.

Fig. 5 is a fragmentary side elevation of an automobile, showing the exposed part of my arrangement as used under a visor or sun-shield.

Fig. 6 is an enlarged perspective view of a portion of the air distributing tube, employed in the embodiments of Figs. 1 to 5.

Fig. 7 is an enlarged bottom view of a part of a modified form of such a tube, namely one in which the tube has a longitudinal slot instead of spaced perforations for the emission of air.

Fig. 8 is a perspective view of the hood employed over the air distributing tube in Figs. 1, 2 and 3.

Generally speaking, my invention accomplishes the intended purposes by providing a curtain of rapidly descending air in front of the window pane, wind-shield or the like which is to be guarded from moisture, this curtain being so disposed that even a rapid forward movement of the vehicle will not permit the descending air and the moisture intercepted by this air to be deflected rearwardly against the glass pane. With this in mind, I preferably project at least the main portion of the curtain of air from points disposed above the top of the window pane and at some distance forward of this point, and also project the air somewhat forwardly at an inclination which will compensate for the rearward pushing effect of the air in front of the moving vehicle.

I also desirably extend this air curtain rearwardly at both sides of the window pane so as to shield the latter against the reception of moisture driven sidewise of the vehicle by lateral or diagonal winds.

For example, in employing my invention for shielding a wind-shield or other frontal window pane 1, from moisture, I fasten to the front 2 of the vehicle body above this pane an air duct arranged as shown in Figs. 1 to 3 inclusive. This duct preferably has a main portion 3 extending horizontally above the window pane and spaced forwardly from the said body front portion 2, together with rearwardly directed duct portions 4 and 5, which extend to the said front portion 2 and which desirably are continued through the latter so as to afford the supply connections for the compressed air. The entire exposed duct, consisting of the portions 3, 4 and 5, is provided with a large number of relatively small perforations 6 for the emission of compressed air supplied to the duct. These perforations or air outlets are all disposed in the lower portion of the duct and are arranged so as to direct the air away from the window pane 1. For this purpose I preferably drill the perforations 6 in the main duct portion 3 so that they project the air in jets which are somewhat inclined forwardly, as shown by the dotted line 7 in Figs. 1 and 2. Likewise, I drill the air outlets in the duct portions 4 and 5 so that they will project the air laterally away from the window pane as shown by the dotted lines 8 and 9 in Fig. 1.

For the air supply, I may employ any suitable means, as for example the air compressor 10 shown diagrammatically in Fig. 3 as connected to both ends of the air-distributing duct through pipes 11, the supply of air being controlled by suitable valves 12. Or, if my invention is applied to a street-car or other vehicle which already is provided with means for furnishing a supply of compressed air (as needed for the brakes), I simply connect the air-distributing duct to this compressed air supply. To secure a fairly uniform ditsribution of the air, I preferably connect the duct at both ends to the air supply and also preferably taper the duct towards the middle of the main portion 3 as shown in Fig. 3, so that its bore decreases towards that middle.

Moreover, I preferably locate the air outlets 6 sufficiently close to each other so that the jets of air issuing from adjacent outlets will merge into each other, thereby forming an air curtain in the form of a substantially continuous sheet. By so doing, it will be obvious that with air supplied at even a moderate pressure, I obtain an air curtain both in front of the window pane and at the opposite sides of this pane. This curtain intercepts the descending rain or snow so as to prevent such moisture from reaching the window pane, and since the air is downwardly directed, it carries the moisture down below the window. By sloping the main portion of this air curtain forwardly, I counteract the rearward pushing effect of the air against which the vehicle is moving and by spacing the main portion 3 of the duct forwardly from the front of the vehicle body, I increase the effective distance between the air curtain and the shielded window pane still more. Consequently, I can readily make my arrangement highly effective even for vehicles traveling at a high rate of speed. Likewise, by providing the air curtain with lateral wind portions, formed by the air issuing through the shanks 4 and 5 of the substantially U-shaped duct, I prevent side winds from blowing moisture against the pane.

In practice, my invention may obviously be applied to vehicles regardless of their nature and regardless of the particular construction of the front body portion adjacent to the window pane or wind-shield which is to be guarded. Thus, the air duct may be entirely supported by the upper portion of the body front as shown in Fig. 2, or may be partly supported from a sun-shield or visor 13 as shown in Fig. 5. In either case, it will be obvious that no mechanism whatever is required at or near the window pane which is to be shielded; also, that by keeping the moisture initially away from this pane, I prevent the formation on the latter of frost or other films of moisture which could only be removed under certain temperature conditions by mechanisms of the class of the wind-shield cleaners heretofore employed.

When the air-distributing tube is installed under a visor or sun-shield, the latter will act as a protecting roof portion to prevent rain or snow from descending between the forward tube portion 3 and the front of the vehicle body, but in this case I preferably still provide side guards 14 for preventing wind from driving the moisture from either side of the vehicle under the visor and above the tube portions 4 and 5, or in other words above the top of the air curtain. Where the vehicle has no visor or other portion projecting sufficiently forward of the body front to form a roof over the air-distributing tube, I desirably provide such a protecting roof 15 integral with the side guards 14. In this case, the roof 15 desirably has a forward extension 16 sloping downward forwardly beyond the air outlets in the forward air tube portion 3, as shown in Figs. 2 and 8. Thus arranged, the roof (which can be attached to the body front as shown in Fig. 2) prevents winds from striking any part of the projected air until after the latter has issued from the air-distributing tube, so that even strong air currents will not cause an undue deflection of the emitted air. To aid further in this, I may also provide the air-tube with a web 17 sloping downward in front of the air outlets 6 in the forward tube portion 3 and sloping laterally outward of the vehicle in the tube shanks 4 and 5.

However, while I have illustrated and described my invention in embodiments including certain highly desirable features, I do not wish to be limited to the details of the construction and arrangement thus disclosed, it being obvious that these might be varied in many ways without departing either from the spirit of my invention or from the appended claims. For example, instead of forming spaced air outlets in the air-distributing tube, I may employ a narrow but continuous slot 18' for this purpose as shown in Fig. 7. So also, I may provide the tube 3 at its top with a rearwardly directed web 18 whereby the roof 15 can conveniently be secured to it.

I claim as my invention:—

1. A moisture guard for the frontal window pane of a vehicle, comprising a curtain of compressed air projected downwardly from above the window pane, the said curtain having a main portion extending in front of the window pane and wings extending from the said main portion substantially to the adjacent front of the vehicle at opposite sides of the window pane.

2. A moisture guard as per claim 1, in which the main air curtain portion slopes forwardly downward.

3. Means for preventing the deposition of atmospheric moisture on the frontal window pane of a vehicle, comprising a fixedly mounted duct extending transversely of the vehicle above the portion of the said window pane which is to be shielded from moisture, and at a considerable distance forwardly of the pane the duct having apertures directed downwardly and forwardly of the window pane at a sharply acute angle to the face of the pane, and means for supplying air under pressure to the duct.

4. A moisture-deposition preventing arrangement as per claim 3 in which the apertures are so closely spaced that the issuing air forms a substantially uninterrupted air curtain in front of the said portion of the window pane for preventing descending moisture from reaching the pane.

5. Means for preventing the deposition of atmospheric moisture on the frontal window pane of a vehicle, comprising a duct extending transversely of the vehicle above the portion of the said window pane which is to be shielded from moisture, the duct having a main portion extending transversely of the vehicle forwardly of the window pane and having lateral portions leading from the said main portion substantially to the said vehicle front at opposite sides of the window pane, there being apertures in the lower parts of all of the said duct-portions.

6. A moisture-deposition preventing arrangement as per claim 5, in which the lateral duct portions are spaced laterally outward from the sides of the window pane.

7. Means for preventing the deposition of atmospheric moisture on the frontal window pane of a vehicle, comprising a substantially U-shaped duct disposed above the window pane and provided with downwardly open apertures, the said duct having its shanks extending forwardly from the body of the vehicle and having the portion connecting the shanks disposed substantially parallel to the window pane, and means for supplying air under pressure to the duct through one of the said shanks.

8. Means for preventing the deposition of atmospheric moisture on the frontal window pane of a vehicle, comprising a substantially U-shaped duct disposed above the window pane and provided with downwardly open apertures, the said duct having its shanks extending forwardly from the body of the vehicle and having the portion connecting the shanks disposed substantially parallel to the window pane, and means for supplying air under pressure to the duct through both of the shanks.

9. Means for preventing the deposition of atmospheric moisture on the frontal window pane of a vehicle, comprising a substantially U-shaped duct disposed above the window pane and provided with downwardly open apertures, the said duct having its shanks extending forwardly from the body of the vehicle and having the portion connecting the shanks disposed substantially parallel to the window pane, and means for supplying air under pressure to the duct through both of the shanks, the duct having the bore of its said connecting portion tapering in size from both shanks toward the middle of the said portion.

10. The method of shielding the front window pane of a vehicle from the deposition of moisture thereon, which consists in projecting air, in front of the portion of the vehicle body in which the window pane is mounted, in the form of a curtain having a front portion spaced forwardly from the said pane and having wings extending rearwardly from the said front portion to the said body front at opposite sides of the said pane.

11. The combination with a vehicle body having a frontal window pane, of a duct apertured in its bottom and comprising a front part extending substantially parallel to the said pane above and at a distance forwardly of the pane together with lateral duct parts extending rearwardly from the ends of the said front part to the front of the vehicle body, means for supplying compressed air to the duct, and a hood extending over all of the said duct parts to form a roof over the duct and over the space between the duct and the said body front.

12. The combination with a vehicle body having a frontal window pane, of a duct apertured in its bottom and comprising a front part extending substantially parallel to the said pane above and at a distance forwardly of the pane together with lateral duct parts extending rearwardly from the ends of the said front part to the front of the vehicle body, means for supplying compressed air to the duct, and a hood extending over all of the said duct parts to form a roof over the duct and over the space between the duct and the said body front, the hood having edge portions depending below the bottom of the duct.

13. The combination with a vehicle body having a frontal window pane, of a duct apertured in its bottom and disposed forwardly of the said pane and above the latter, the duct having a depending web disposed forwardly of the apertures in the duct and serving as a wind-shield for air initially issuing from the duct through the apertures therein.

14. Moisture-deposition preventing means as per claim 12, in which the duct has an integral web through which it is secured to the hood.

Signed at Chicago, Illinois, October 24, 1924.

JOSEF BRANDSTETTER.